United States Patent [19]

Adachi

[11] 4,179,751

[45] Dec. 18, 1979

[54] MEMORY APPARATUS FOR DISASTER PREVENTING SYSTEM

[75] Inventor: Akio Adachi, Kawasaki, Japan

[73] Assignee: Hockiki Corporation, Tokyo, Japan

[21] Appl. No.: 962,797

[22] Filed: Nov. 21, 1978

[30] Foreign Application Priority Data

Nov. 24, 1977 [JP] Japan .................................. 52-139820

[51] Int. Cl.$^2$ .............................................. G11C 11/40
[52] U.S. Cl. .................................. 365/228; 307/202.1
[58] Field of Search ................ 365/228, 229; 307/238, 307/92, 94

[56] References Cited

U.S. PATENT DOCUMENTS 3,676,717 7/1972 Lockwood ............................ 365/228

Primary Examiner—Terrell W. Fears
Attorney, Agent, or Firm—Haseltine, Lake & Waters

[57] ABSTRACT

A memory apparatus which serves as an interface apparatus between an alarm system and a computer, whereby alarm signals from the alarm system each containing as its content a class of alarm, e.g., a fire, burglary or absence alarm or the location of an alarm, are introduced into the relatively large computer so as to display the alarms or control the operation of various disaster preventive units. The memory apparatus comprises a plurality of memory circuits connected in cascade and each adapted to store an alarm signal, a plurality of flip-flop circuits for shifting the memory content from the input side memory circuit into the output side memory circuit, a drive circuit for sequentially actuating the flip-flop circuits and a halting circuit for stopping the operation of the drive circuit. When the alarm signal is shifted sequentially so that it is eventually stored in the final-stage memory circuit, the alarm signal is in readiness for reading through the output terminals by the computer which in turn will be interrupted to read in the alarm signal when it is idle or ready to work on the alarm signal. After the interruption has been completed, the memory content of the memory circuit just preceding the final stage is shifted into the final-stage memory circuit, and in this way the alarm signals are sequentially introduced into the computer by interruption in the order of the first signal, second signal, third signal and so on. The storage capacity of each memory circuit needs not be greater than that required to store each alarm signal, and also the read time required for the computer upon each interruption is reduced to that required for reading only the content of the final-stage memory circuit or the time required to read the number of bits corresponding to one alarm signal.

3 Claims, 1 Drawing Figure

MEMORY APPARATUS FOR DISASTER PREVENTING SYSTEM

BACKGROUND OF THE INVENTION

The present invention relates to a memory apparatus for a disaster preventing system which is designed to serve as an interface apparatus to aid the processing by a computer of the alarm signals from an alarm system.

With a known type of alarm system designed to generate an alarm signal containing as its signal content a class of alarm, e.g., a fire, burglary or absence alarm or the location of an alarm, there are cases where the receiver of the alarm system is connected to a computer through an interface unit, whereby each alarm signal is subjected to data processing in the computer so as to give the necessary leading direction to a safe place, control the operation of various disaster preventive equipment such as fire screens, fire extinguishing equipment, etc. In this case, while the use of the ordinary interface unit will result in no difficult problems if the computer is for exclusive use with the alarm system, there are many instances where the computer is designed for economical reason or the like to control the operation of many different apparatus other than the alarm system, thus giving rise to the following disadvantages.

For example, where the centralized traffic control is accomplished by a large computer installed in a control building and the computer is operatively associated with the fire alarm system of the building, the control of train operation is given preference to the processing of alarm signals from the fire alarm system and consequently the computer is not allowed to work continuously on those alarm signals over a long period of time. As a result, with the alarm signals whose signal contents differ moment by moment, that is, the first signal differs from the second and so on, it is impossible to subject all the alarm signals to the data processing thus giving rise to a disadvantage that it is impossible to entirely grasp the course in which the fire has spreaded and it is thus impossible to give the proper leading direction to a safe place and effectively control the operation of the disaster preventing equipment.

While a memory circuit for temporarily storing alarm signals may be provided to overcome these deficiencies, this attempt of simply providing the memory circuit has the following disadvantages. In other words, the interface unit is so constructed that when a first alarm signal is generated so that the alarm signal is stored in the memory circuit and simultaneously an interruption signal is applied to the computer causing it to read the content of the memory circuit when it is idle, and consequently even in cases where the memory circuit contains only a single alarm signal the computer is required to read all the bits corresponding to the entire memory capacity of the memory circuit, thus wasting the read time. The waste read time after the reading of the alarm signal content represents the time during which the computer can do no useful work but waste the time, and the essential traffic control will be greatly affected adversely. While it is possible to use a computer designed so that the computer detects the number of alarm signals stored in the memory circuit so as to read only the stored alarm signals, this is also disadvantageous in that a certain time is required to detect the number of alarm signals stored and also the use of a complex program is required.

SUMMARY OF THE INVENTION

It is therefore a principal object of the present invention to provide a memory apparatus designed to serve as an interface apparatus between an alarm system and a computer, wherein alarm signals whose contents differ from one another with the passage of time are stored one at a time in each of a plurality of memory circuits and simultaneously the alarm signals are read by the computer sequentially one at a time starting with the alarm signal earliest in time during its idle time, whereby the computer is interrupted to read with a very short read time those alarm signals each usually generated after a relatively long period of time, and consequently the contents of successive alarm signals are applied to the computer without disturbing the order of their occurrence in time, thus eliminating any effect on the processing of data other than the alarm signals in the computer.

It is another object of the present invention to provide such a memory apparatus wherein the plurality of memory circuits are connected in cascade from the input side to the output side and the applied alarm signals are shifted in such a manner that the earliest alarm signal in time is always stored one at a time in the final-stage memory circuit, whereby when the alarm signal is stored in the final-stage memory circuit, an interruption signal is applied to the computer so that the computer reads in the alarm signal during its idle time and at the same time the contents of the memory circuits are successively shifted to the following stages, thus allowing the first-stage memory circuit to take in a further alarm signal.

To accomplish these objects, the improved memory apparatus provided in accordance with the invention comprises a main circuit including a plurality of cascade connected memory circuits each having a storage capacity corrrsponding to the number of bits constituting each alarm signal, and a control circuit for controlling the writing and reading operations of the memory circuits in response to the application of each alarm signal and the completion of interruption of the computer. The control circuit is designed so that in response to a control signal which is applied to the control circuit each time an alarm signal is applied to it from the alarm system, the alarm signal is written into the first-stage memory circuit and it is then shifted up to the final-stage memory circuit in such a manner that the alarm signal is shifted to the memory circuit just before the final-stage memory circuit when the latter has already been storing the previously introduced alarm signal, and in this way the applied alarm signals are successively stored in the memory circuits with the final-stage memory circuit storing the signal first received. For the purpose of this control the control circuit comprises a plurality of flip-flop circuits corresponding to the memory circuits, a drive circuit responsive to the control signal to sequentially control the memory circuits and the flip-flop circuits of the respective stages to effect the shifting of write operation, and a halting circuit for halting the operation of the drive circuit in response to the arrival of a further alarm signal when every memory circuit has stored an alarm signal. With the memory circuits connected in cascade, each memory circuit is conditioned for the writing of the next alarm signal after the following memory circuit has completed its writing operation, and the final-stage memory circuit is responsive to an end-of-interruption signal to get ready for the writing of the next alarm signal so that when the next alarm signal has been stored in the preceding memory circuit the final-stage memory circuit immediately reads in the alarm signal from the preceding memory circuit. With the alarm signal being stored in the final-stage memory circuit, the control circuit applies an interruption signal to the computer which in turn responds to the interruption signal to read in the stored content of the final-stage memory circuit during the period of idle operation and the computer applies an end-of-interruption signal to the control circuit upon completion of the reading operation.

Thus, the apparatus of this invention has among its great advantage the fact that since an interruption signal is generated in response to the shifting of a signal to the final-stage memory circuit, the computer is required to read in the stored content of the final-stage memory circuit only in response to the application of the interruption signal with the result that when a second alarm signal is generated, an interruption signal is again generated in response to the shifting of the signal to the final stage and consequently the computer is required to read in the content of the final-stage memory circuit only in response to the second interruption signal, thus allowing the computer to read in sequentially only as many alarm signals as actually generated and thereby reducing greatly the required read time. The number of memory circuits may be varied depending on the amount of time which the computer can spare for the processing of data from the alarm system.

Those and other objects, features and advantages of the present invention will become more apparent from the following description taken in conjunction with the accompanying drawings.

BRIEF DESCRIPTION OF THE DRAWINGS

The single FIGURE drawing is a circuit diagram showing in block diagram form a part of a memory apparatus according to an embodiment of the present invention, and the associated alarm system and computer are not shown.

DESCRIPTION OF THE PREFERRED EMBODIMENT

Figure 1:
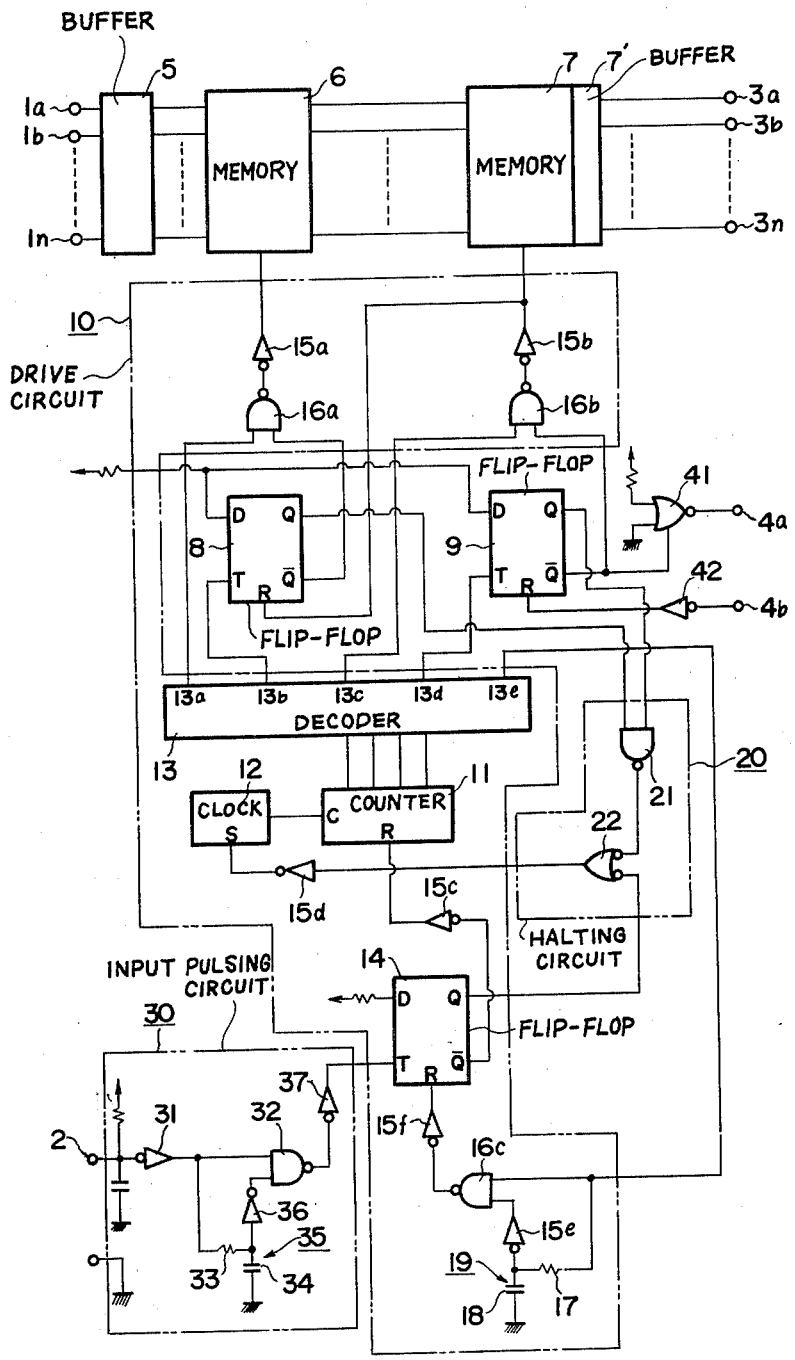

In the FIGURE, numerals 1a, 1b to 1n designate input terminals to which an n-bit alarm signal is applied as a parallel set input from the receiver of an alarm system which is not shown, and 2 a control signal input terminal for receiving from the receiver a control signal or binary signal which goes to "0" when an alarm signal is being applied to the input terminals and which goes to "1" when no alarm signal is being applied to the input terminals. The alarm signal may be an n-bit binary coded signal and it is assumed that its code content contains a class of alarm such as a fire, burglary or absence alarm or the location of an alarm. Numerals 3a, 3b to 3n designate output terminals corresponding to the input terminals 1a, 1b to 1n and disposed to transmit the alarm signal to a computer which is not shown, and 4a and 4b designate respectively an interruption signal output terminal for deliverying an interruption signal to the computer and an end-of-interruption signal input terminal for receiving an end-of-interruption signal from the computer.

The terminals 1a, 1b to 1n and 2 are connected to the receiver of the alarm system and the terminals 3a, 3b to 3n, 4a and 4b are connected to the computer, whereby an alarm signal applied to the input terminals 1a, 1b to 1n is eventually written into the computer through the output terminals 3a, 3b to 3n, and in accordance with the code content of the written alarm signal the computer sequentially controls such disaster preventing equipment as fire screens, smoke exhauster and fire extinguishing equipment, display unit such as CRT display unit or visual or acoustic unit for leading people to a safe place.

In the illustrated embodiment two memory circuits 6 and 7 are connected in cascade between the input and output terminals, and while the final-stage memory circuit 7 incorporates an output buffer circuit 7', it is of course possible to separately provide the output buffer circuit 7' in the like manner as an input buffer circuit 5. The two-stage memory circuits 6 and 7 each has a memory capacity of at least n bits and adapted to directly store a parallel set input or alarm signal in code form as a parallel code signal.

A control circuit for controlling the writing and reading operations of the memory circuits 6 and 7, comprises flip-flop circuits 8 and 9 respectively associated with the memory circuits 6 and 7, a drive circuit 10 responsive to a control signal applied to the control signal input terminal 2 so as to sequentially control the operation of the memory circuits and the flip-flop circuits of the respective stages to shift the writing operation from the memory circuit 6 to the memory circuit 7, a halting circuit 20 for stopping the operation of the drive circuit 10 in response to the arrival of a further alarm signal when the memory circuits 6 and 7 each has stored an alarm signal, and an input pulsing circuit 30 which will be provided only in such cases where a control signal is in the form of either a continuous "0" or "1" level signal.

The flip-flop circuits 8 and 9 each is of the type so that when a "1" signal is applied to its input T, its output Q goes from "0" to "1" and simultaneously its inverted output $\overline{Q}$ goes from "1" to "0", and the application of a "1" signal to its reset terminal R changes the circuit back to the initial state. The inverted output Q of the flip-flop circuit 8 is connected to one input terminal of a NAND circuit 16a, and consequently when a "1" signal is applied by the output of the NAND circuit 16a to the memory circuit 6 by way of an inverter 15a, the alarm signal appearing at the input terminals 1a to 1n in written into the memory circuit 6 through the buffer circuit 5. Also the inverted output $\overline{Q}$ of the flip-flop 9 is connected to one input terminal of a NAND circuit 16b, and consequently when a "1" signal is applied by the output of the NAND circuit 16b to the memory circuit 7 by way of an inverter 15b, the stored content of the preceding memory circuit 6 is written into the memory circuit 7. The output of the final-stage inverter 15b is connected to the reset terminal R of the flip-flop 8, so that when the inverter 15b generates a "1" signal or when the memory circuit 7 performs a write operation, the flip-flop 8 is reset. An end-of-interruption signal is applied from the end-of-interruption signal input terminal 4b to the reset terminal R of the final-stage flip-flop 9 through an inverter 42, and consequently when the output of the inverter 42 goes to a "1" signal or when an end-of-interruption signal or "0" signal is applied from the computer to the terminal 4b to which was previously given a "1" signal, the flip-flop 9 is reset. On the other hand, the inverted output Q of the flip-flop 9 controls a tristate circuit 41, so that when there is a "1"

signal from the inverted output $\bar{Q}$, a "1" signal is generated at the interruption signal output terminal 4a, and when the inverted output $\bar{Q}$ goes to a "0" signal or the final-stage memory circuit 7 performs a write operation, an interruption signal or "0" signal is delivered to the terminal 4a.

In the drive circuit 10 a decoder 13 is controlled by a counter 11 in synchronism with the clock pulses from a clock pulse generator 12, and a "1" signal is sequentially generated from its output terminals 13a to 13e. In other words, a "1" signal is shifted sequentially from the output terminal 13a to the terminal 13b, then to the terminal 13c and finally to the terminal 13e, and the timing of this shifting is synchronized with the timing of clock pulses through the counter 11. The decoder 13 has its first output terminal 13a connected to the other input terminal of the preceding-stage NAND circuit 16a, its second output terminal 13b connected to the input terminal T of the preceding-stage flip-flop 8, its third output terminal 13c connected to the other input terminal of the final-stage NAND circuit 16b and its fourth output terminal 13d connected to the input terminal T of the following-stage flip-flop 9. As will be described later, a "1" signal generated at the fifth output terminal 13e is used to stop the operation upon completion of one cycle of the decoder 13.

The clock pulse generator 12 is so designed that clock pulses of a predetermined period are applied to the clock input terminal C of the counter 11 only when a "1" signal is being applied to the start input terminal S of the clock pulse generator 12, and the counter 11 drives the decoder 13 in synchronism with the applied clock pulses only when a "1" signal is being applied to the control input terminal R of the counter 11. The drive circuit 10 includes another flip-flop circuit 14 which controls the operation of the clock pulse generator 12 and the counter 11. The flip-flop circuit 14 is so designed that the application of a "1" signal to its input terminal T causes its output Q to go from "0" to "1" and its inverted output $\bar{Q}$ to go from "1" to "1", and the application of a "1" signal to its reset input terminal R changes the circuit back to the initial state. The inverted output $\bar{Q}$ of the flip-flop circuit 14 is connected to the control input terminal R of the counter 11 through an inverter 15c, and consequently the counter 11 is brought into operation when the inverted output $\bar{Q}$ goes to a "0" signal. The output Q of the flip-flop circuit 14 is connected to one input terminal of a NOR circuit 22 in the halting circuit 20, and the output of the NOR circuit 22 is connected to the start input terminal S of the clock pulse generator 12 through an inverter 15d. The halting circuit 20 includes a NAND circuit 21 in addition to the NOR circuit 22, and the NAND circuit 21 has its output connected to the other input terminal of the NOR circuit 22 and its two input terminals respectively connected to the output Q of the flip-flops 8 and 9, respectively. As a result, the clock pulse generator 12 generates its clock pulses only when there is a "0" signal at the output of the NOR circuit 22 in the halting circuit 20, that is, only when a "1" signal is generated at the output Q of the flip-flop 14 and simultaneously there is a "1" signal at the output of the NAND circuit 21 (when there is a "0" signal at least at the output Q of one or the other of the flip-flops 8 and 9).

As mentioned previously, the halting circuit 20 stops the operation of the clock pulse generator 12 when a "1" signal is generated at the output Q of the flip-flops 8 and 9, respectively, so that as will be seen from the latter description of the operation, even when a control signal indicative of the arrival of a further alarm signal changes the state of the flip-flop 14 to generate a "1" signal at its output Q, the decoder 13 is not brought into operation when the memory circuits 6 and 7 each has already stored the previously generated alarm signal.

The flip-flop circuit 14 is reset in response to the application of a "1" signal to its reset input terminal R, and this takes place when a "1" signal is generated at the fifth output terminal 13e of the decoder 13. In other words, the "1" signal generated at the output terminal 13e is applied to one input terminal of a NAND circuit 16c and on the other hand the "1" signal appearing at the output of an inverter 15e is applied to the other input terminal of the NAND circuit 16c until the positive edge of the "1" signal at the output terminal 13e is delayed by a delay circuit 19 comprising a resistor 17 and a capacitor 18 and then applied to the inverter 15e. As a result, the NAND circuit 16c generates a "0" signal only during the delay time following the generation of a "1" signal at the output terminal 13e, and this "0" signal is inverted by an inverter 15f to a "1" signal which in turn is applied to the reset terminal R of the flip-flop 14. In this way, when a "1" signal is generated at the fifth output terminal 13e of the decoder 13, the flip-flop 14 is reset and the operation of the counter 11 is stopped.

The input pulsing circuit 30 is one which is so designed that a control signal which goes to "0" only in response to the arrival of an alarm signal but otherwise remains at "1", is converted into a single pulse signal when it goes to "0" and the pulse signal is used to trigger the flip-flop circuit 14, and the input pulsing circuit 30 needs not be used in cases where the control signal originally consists of a single pulse signal indicative of the arrival of an alarm signal.

The input pulsing circuit 30 comprises an inverter 31 connected to the control signal input terminal 2, a NAND circuit 32 whose one input terminal receives the output of the inverter 31 directly and the other input terminal receives the output of the inverter 31 through a delay circuit 35 comprising a resistor 33 and a capacitor 34 and an inverter 36, and an inverter 37 for inverting the output of the NAND circuit 32 and applying it to the input terminal T of the flip-flop circuit 14.

With the circuit construction described above, the memory apparatus of the invention operates as follows.

In the initial condition, that is, when there is no alarm signal applied to the input terminals 1a to 1n, a "1" signal is continuously applied to the control signal input terminal 2 by the action of the receiver of the alarm system. Consequently, the inverter 31 generates a "0" signal so that the capacitor 34 stores no charge and a "0" signal is applied to the inverter 36 which in turn generates a "1" signal. As a result, the NAND circuit 32 receives the "1" and "0" signals at its input terminals, so that the NAND circuit 32 generates a "1" signal and a "0" signal is applied to the input terminal T of the flip-flop circuit 14 through the inverter 37. In this condition, the output Q of the flip-flop circuit 14 is at "0" and its inverted output $\bar{Q}$ is at "1", and the "1" signal at the inverted output $\bar{Q}$ applies a "0" signal to the control input terminal R of the counter 11 through the inverter 15c, thus rendering the counter 11 inoperative. On the other hand, the "0" signal at the output Q of the flip-flop 14 applies a "0" signal to the start input terminal S of the clock pulse generator 12 through the NOR circuit 22 and the inverter 15d, and consequently the clock pulse generator 12 is also not brought into operation. Since the clock pulse generator 12 and the counter 11 are not in operation, the decoder 13 is also out of operation and only a "0" signal is appearing at each of the output terminals 13a to 13e. As a natural consequence, the "0" signal is applied to the input terminal T of the flip-flop circuits 8 and 9, respectively, so that the flip-flop circuits 8 and 9 each has a "0" at its output Q and a "1" at its inverted output $\bar{Q}$ and the NAND circuits 16a and 16b each has a "0" at its one input and a "1" at its other input terminal. Consequently, a "0" signal is applied to each of the memory circuits 6 and 7 through the inverters 15a and 15b, respectively. Since the flip-flop circuits 8 and 9 each has the "0" at its output Q, the "0" is applied to each of the input terminals of the NAND circuit 21 in the halting circuit 20, so that the NAND circuit 21 generates a "1" signal at its output and this "1" signal is applied to one input terminal of the NOR circuit 22. Also the "0" signal at the fifth output terminal 13e of the decoder 13 is applied directly to one input terminal of the NAND circuit 16c and the same "0" signal is applied as a "1" signal to the other input terminal of the NAND circuit 16c through the inverter 15e due to the absence of stored charge in the capacitor 18. As a result, the NAND circuit 16c generates a "1" signal and this "1" signal is inverted by the inverter 15f to a "0" signal which in turn is applied to the reset input terminal R of the flip-flop circuit 14.

In this initial condition, when a first alarm signal is applied from the alarm system to the input terminals 1a to 1n and a control signal or "0" signal indicative of the application of the signal is applied to the input terminal 2, the output of the inverter 31 goes to "1" and this "1" signal is applied to one input terminal of the NAND circuit 32. As a result, since the output of the inverter 36 remains at "1" during the delay time of the delay circuit 35 from the said positive going transition of the inverter output and since it is applied to the other input terminal of the NAND circuit 32, the output of the NAND circuit 32 goes to "0". This "0" signal is inverted by the inverter 37 and the resulting "1" signal triggers the flip-flop circuit 14, thus changing its state and thereby causing its output Q to go to "1" and its inverted output $\bar{Q}$ to go to "0". When the output Q goes to "1", since the output of the NAND circuit 21 is also at "1" as mentioned previously, the output of the NOR circuit 22 goes to "0" and a "1" signal is applied to the clock pulse generator 12, thus causing it to apply clock pulses to the counter 11. On the other hand, when the inverted output $\bar{Q}$ of the flip-flop circuit 14 goes to "0", a "1" signal is applied to the control input terminal R of the counter 11 and the counter 11 is brought into operation, thus driving the decoder 13 in synchronism with the timing of the clock pulses. Consequently, when a "1" signal is generated at the first output terminal 13a of the decoder 13, since the inverted output $\bar{Q}$ of the flip-flop circuit 8 is also at "1" as mentioned previously, the output of the NAND circuit 16a goes to "0" so that a "1" signal is applied to the memory circuit 6 and the first alarm signal at the input terminals 1a to 1n is written into the memory circuit 6 through the buffer circuit 5. Then, when the first output terminal 13a of the decoder 13 goes to "0" and the second output terminal 13b goes to "1", the flip-flop circuit 8 changes its outputs, so that its inverted output $\bar{Q}$ goes to "0" and a "0" signal is applied to the memory circuit 6 through the inverter 15a, thus terminating the write operation. When the second output terminal 13b of the decoder 13 goes to "0" and the third output terminal 13c goes to "1", since the inverted output $\bar{Q}$ of the flip-flop circuit 9 is also at "1" as mentioned previously, the output of the NAND circuit 16b goes to "0" and a "1" signal is applied to the memory circuit 7. Consequently, the first alarm signal previously stored in the memory circuit 6 is shifted and written into the memory circuit 7. The output of the NAND circuit 16b is inverted by the inverter 15b and the resulting "1" signal is applied to the reset terminal R of the flip-flop circuit 8, thus changing its outputs back to the initial states. When the third output 13c of the decoder 13 goes to "0" and the fourth output terminal 13d goes to "1", the outputs of the flip-flop circuit 9 change their states so that its output Q goes to "1" and its inverted output $\bar{Q}$ goes to "0" which in turn causes the tristate circuit 41 to deliver a "0" signal or interruption signal to the interruption signal output terminal 4a. When the fourth output terminal 13d of the decoder 13 goes to "0" and the fifth output terminal 13e goes to "1", since one input terminal of the NAND circuit 16c is at "1" and the other input terminal remains at "1" until the delay time of the delay circuit 19 expires, the output of the NAND circuit 16c goes to "0" and this "0" signal is inverted by the inverter 15f and applied to the reset terminal R of the flip-flop circuit 14 to reset it. When the flip-flop circuit 14 is reset so that its output Q goes to "0", the input signal to the start input terminal S of the clock pulse generator 12 goes to "0" and the input signal to the control input terminal R of the counter 11 also goes to 11, thus bringing both of the clock pulse generator 12 and the counter 11 out of operation. When a second alarm signal is applied to the input terminals 1a to 1n and a "0" signal or control signal is again applied to the control signal input terminal 2, the decoder 13 is again driven in synchronism with the timing of clock pulses from the clock pulse generator 12 as mentioned previously. When the first output terminal 13a of the decoder 13 goes to "1", as mentioned previously the output of the inverter 15a goes to "1" and the second alarm signal is written into the memory circuit 6. Then, when the first output terminal 13a of the decoder 13 goes to "0" and the second output terminal 13b goes to "1", the outputs of the flip-flop circuit 8 change their states so that its output Q goes to "1" and its inverted output $\bar{Q}$ goes to "0", and the "1" signal from the output Q is applied to one input terminal of the NAND circuit 21. Since the "1" signal from the output Q of the flip-flop circuit 9 is being applied to the other input terminal of the NAND circuit 21 as mentioned previously, the output of the NAND circuit 21 goes to "0" and this "0" signal is applied to one input terminal of the NOR circuit 22 thus causing it to apply a "1" signal to the inverter 15d. As a result, a "0" signal is applied to the start input terminal S of the clock pulse generator 12, so that the operation of the clock pulse generator 12 is stopped and simultaneously the counter 11 stops driving the decoder 13.

In this condition, even a third alarm signal is introduced to the input terminals 1a to 1n and simultaneously a "0" signal or control signal is applied to the control signal input terminal 2, since the "0" signal is being applied to the NOR circuit 22 from the NAND circuit 21 of the halting circuit 20 as mentioned previously, the input signal to the start input terminal S of the clock pulse generator 12 always remains at "0" irrespective of the action of the control signal on the flip-flop 14, so that the clock pulse generator 12 is not brought into operation and the decoder 13 is kept at rest. Consequently, the third alarm signal is not written into the memory circuit 6.

To write the stored content of the memory circuit 7 through the output buffer circuit 7' into the computer by interruption, on condition that the a "0" signal is being applied to the terminal 4a when the computer is idling, the stored content of the memory circuit 7 is read in and then a "0" signal or end-of-interruption signal is applied from the computer to the terminal 4b. The "0" signal at the terminal 4b is inverted by the inverter 42 and the resulting "1" signal is applied to the reset input terminal R of the flip-flop circuit 9. Consequently, the flip-flop circuit 9 is reset so that its output Q goes to "0" and its inverted output $\bar{Q}$ goes to "1". The "0" signal at the output $\bar{Q}$ causes the output of the NAND circuit 21 to go to "1" and consequently the output of the NOR circuit 22 goes to "0". This "0" signal is inverted by the inverter 15d and the resulting "1" signal is applied to the start input terminal S of the clock pulse generator 12, thus causing it to apply its clock pulses to the input C of the counter 11. Since the "0" signal is being generated at the inverted output $\bar{Q}$ of the flip-flop circuit 14 as mentioned previously, the counter 11 comes into operation immediately in response to the application of the clock pulses and the decoder 13 which has been at rest with the "1" signal being generated at the second output terminal 13b is again brought into operation. When this occurs, the second output terminal 13b of the decoder 13 goes to "0" and the third output terminal 13c goes to "1". In this case, the inverted output $\bar{Q}$ of the flip-flop circuit 9 is being at "1" so that the output of the NAND circuit 16b goes to "0" and this "0" signal is inverted by the inverter 15b. As a result, a "1" signal is applied to the memory circuit 7 and the stored content of the preceding memory circuit 6 or the second alarm signal is written into the memory circuit 7. The "1" signal from the inverter 15b also resets the flip-flop circuit 8, so that its output Q goes back to "0" and its inverted output $\bar{Q}$ goes back to "1", thus preparing it for the writing of an alarm signal arriving next. Then, when the third output terminal 13c of the decoder 13 goes to "0" and the fourth output terminal 13d goes to "1", the outputs of the flip-flop circuit 9 change their states and consequently the resulting "0" signal from its inverted output $\bar{Q}$ is delivered as an interruption signal or "0" signal to the interruption signal output terminal 4a, thus preparing for the next interruption of the computer. When the fourth output terminal 13d of the decoder 13 goes to "0" and the fifth output terminal 13e goes to "1", as mentioned previously a "1" signal is applied to the reset input terminal R of the flip-flop circuit 14 through the NAND circuit 16c and the inverter 15f and the flip-flop 14 is reset causing its output Q to go to "0" and its inverted output $\bar{Q}$ to go to "1". As a result, a "0" signal is applied to the clock pulse generator 12 and the counter 11, respectively, and the operation of the decoder 13 is also stopped.

While, in the embodiment described above, two stages of memory circuits are provided, it should readily appear to those skilled in the art to increase the number of stages, and therefore the present invention is not intended to be limited to the number of the memory circuit stages shown.

We claim:

1. In a memory apparatus for a disaster preventing system which is disposed to serve as an interface apparatus wherein alarm signals applied from an alarm system to its input terminals are successively stored and stored contents are delivered from its output terminals to an external computer, the improvement comprising:

a main circuit including a plurality of memory circuits connected in cascade between said input terminals and said output terminals so as to successively store alarm signals;

a plurality of flip-flop means each disposed to be operatively associated with one of said memory circuits whereby when each said flip-flop means is in a set state write operation of said associated memory circuit is disabled, and when each said flip-flop means is in a reset state write operation of said associated memory circuit is enabled;

a drive circuit whereby each time a control signal is received from said alarm system upon application of an alarm signal to said input terminals, one cycle of write operation of each of said memory circuits and the following setting of associated one of said flip-flop means is effected sequentially in the order of the arrangement thereof from said input terminal side to said output terminal side;

a halting circuit disposed to disable the operation of said drive circuit irrespective of the application of a control signal when each of said flip-flop means is in a set state;

means whereby each time one of said memory circuits performs a write operation, said flip-flop means associated with said memory circuit preceding said one memory circuit is reset;

means responsive to an end-of-interruption signal from said computer to reset said flip-flop means associated with final-stage one of said memory circuits which is nearest to said output terminals; and means disposed to apply an interruption signal to said computer when said final-stage flip-flop means is set;

whereby when an alarm signal is applied to said input terminals, said alarm signal is shifted sequentially from first-stage one of said memory circuits to the following ones thereof until said alarm signal is stored in said final-stage memory circuit, thereby a plurality of alarm signals applied sequentially in time to said input terminals are sequentially stored in said memory circuits in a manner that the first one of said alarm signals is stored in said final-stage memory circuit.

2. A memory apparatus according to claim 1, wherein said drive circuit comprises a decoder having a plurality of output terminals for generating actuation signals to effect the write operation of said memory circuits and the setting of said flip-flop means sequentially beginning with the first stage thereof, a combination of a counter and a clock pulse generator disposed to sequentially generating said actuation signals at the plurality of output terminals of said decoder, and another flip-flop means disposed to be set by said control signal and to be reset by said actuation signal generated from the last one of the output terminals of said decoder whereby said counter and said clock pulse generator are brought into operation when said another flip-flop means is set, and said counter and said clock pulse generator are brought out of operation when said another flip-flop means is reset, and wherein said halting circuit includes gate circuit means disposed to prevent the operation of said clock pulse generator irrespective of the operation of said another flip-flop means only when each of said multistage flip-flop means is in a set state.

3. A memory apparatus according to claim 1, wherein said memory circuits each has the same memory capacity greater than the number of bits in each said alarm signal.

* * * * *